United States Patent [19]
Pfeiffer et al.

[11] 4,167,093
[45] Sep. 11, 1979

[54] LAWN MOWER

[75] Inventors: Rainer Pfeiffer, Stuttgart-Feuerbach; Udo Baasner, Hemmingen; Fritz Hugendubel, Stuttgart, all of Fed. Rep. of Germany

[73] Assignee: Fritz Roth KG, Stuttgart-Feuerbach, Fed. Rep. of Germany

[21] Appl. No.: 762,964

[22] Filed: Jan. 27, 1977

[30] Foreign Application Priority Data

Feb. 6, 1976 [DE] Fed. Rep. of Germany ....... 2604609

[51] Int. Cl.² .............................................. A01D 55/18
[52] U.S. Cl. ......................................... 56/17.2; 56/255
[58] Field of Search ................................ 56/17.2, 255; 280/43.13

[56] References Cited

U.S. PATENT DOCUMENTS

| 2,986,402 | 5/1961 | Winton | 280/43.13 |
| 3,357,715 | 12/1967 | Plamper et al. | 280/43.13 |
| 3,677,574 | 7/1972 | Cyr | 280/43.13 |
| 3,874,151 | 4/1975 | Seifert et al. | 56/17.2 |
| 3,972,160 | 8/1976 | Boswell | 56/17.2 X |

Primary Examiner—Russell R. Kinsey
Assistant Examiner—Daniel J. Leach
Attorney, Agent, or Firm—Michael J. Striker

[57] ABSTRACT

A lawn mower has a plurality of wheels each having a shaft, and housing means carrying a cutting element and drive means for driving the latter. The housing means are connected to the shafts movably relative to the same so as to change the distance between the housing means and the shafts to thereby correspondingly change the cutting height of the cutting element. Energy storing means are provided between the housing means and at least one of the shafts and adapted to counteract the weight of the housing means, the drive means and the cutting element so as to aid a user in upwardly adjusting the cutting element. The energy storing means may be formed as a spring, one end portion of which is connected to the housing means and another end portion is connected to a bracket provided on at least one shaft. Brackets of all the shafts may be connected with one another by a connecting member, which connecting member serves at the same time as an adjusting member so that the simultaneous adjustment of the distance between the housing means and the shafts of all the wheels of the lawn mower can be performed.

18 Claims, 5 Drawing Figures

LAWN MOWER

BACKGROUND OF THE INVENTION

The present invention relates to a lawn mower, and particularly to a lawn mower provided with an adjustment of the cutting height of a cutting element and having housing means connected to shafts of wheels of the lawn mower by means of brackets.

Lawn mowers of the above-mentioned type have been proposed. Such lawn mowers comprise a manually operated adjusting device for performing an adjustment of the height of a cutting element. The conventional lawn mowers have the disadvantage that the adjustment of the cutting height of the cutting element is essentially difficult due to the weight of the housing means, the cutting element and a motor for driving the cutting element carried by the housing means, which weight must be manually overcome by a user. In addition, in this case the adjustment must be performed individually relative to each separate shaft of the lawn mower which is an essentially time-consuming and labor-consuming operation.

SUMMARY OF THE INVENTION

Accordingly, it is a general object of the present invention to overcome the disadvantages of the prior art lawn mowers. More particularly, it is an object of the present invention to provide a lawn mower which permits to adjust the cutting height of a cutting element easier and more conveniently than the conventional lawn mowers permit.

It is another object of the present invention to provide a lawn mower in which during the adjustment of the cutting height of the cutting element the weight of housing means, a motor and a cutting element is at least in part compensated and therefore the adjustment is not difficult for a user.

Still another object of the present invention is to provide a lawn mower which permits a simultaneous adjustment of the distance between the housing means and the shafts of all the wheels of the lawn mower, and therefore, the thus performed adjustment is less time-consuming and labor-consuming than that of the conventional lawn mowers.

In keeping with these objects, and with others which will become apparent hereinafter, one feature of the present invention resides in a lawn mower which, briefly stated, comprises a plurality of wheels each having a shaft; housing means carrying a cutting element and drive means for driving the latter, the housing means are connected to the shafts movably relative to the latter so as to change the distance between the housing means and the shafts to thereby correspondingly change the cutting height of the cutting element; and energy storing means provided between the housing means and at least one of the shafts and adapted to counteract the weight of the housing means, the drive means and the cutting element so as to aid a user in upwardly adjusting said cutting height. Preferably, the energy storing means are formed as a spring whose one end is connected to the housing means and the other end is connected to the one bracket. The spring substantially compensates the weight of the housing means, the drive means and the cutting element so that an adjustment of the height of the cutting element in the direction of reducing of this height is as easy as that of in the direction of increasing of this height.

It is especially advantageous if the one bracket is formed as an angle element having two wings fixedly connected to one another in an apex and each having an end section spaced from the apex. An end section of one of the wings is connected to the shaft, and an end section of the other wing engages the spring. A connecting element connecting the one bracket and the housing means is located intermediate the end sections of the wings of the bracket in a pivot point of the latter.

At least the one bracket connected to the spring is further connected with an adjusting member which adjusting member is adapted to arrest the housing means in a plurality of positions. A coulisse (i.e., a gate) having a plurality of depressions is fixedly mounted on the housing means, and a lever is provided on the adjusting member, which lever is engageable with each of the depressions of the coulisse. It is especially preferred if the lever is pushed into the depressions of the coulisse by action of the spring.

In a currently preferred construction all the brackets of two pairs of wheels are connected with each other by means of a connecting member so that the shafts of the wheels and points of connection of the connecting member to those brackets located at the same side of the lawn mower are pivot points of a four-bar linkage. This permits the central adjustment of the distance of the housing means simultaneously relative to all the shafts of the lawn mower. It is especially advantageous if the brackets of all wheels are formed as angle members, and the connecting member comprises a connecting rod connecting the brackets located at the same side of the shafts with one another and serving as the adjusting member, and comprises further connecting rods each connecting the brackets of the same pair of wheels with one another and with the housing means. In this case the lawn mower is of an especially simple construction.

The connecting rod is preferably U-shaped and comprises two further wings forming a recess therebetween, in which recess the spring is received.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
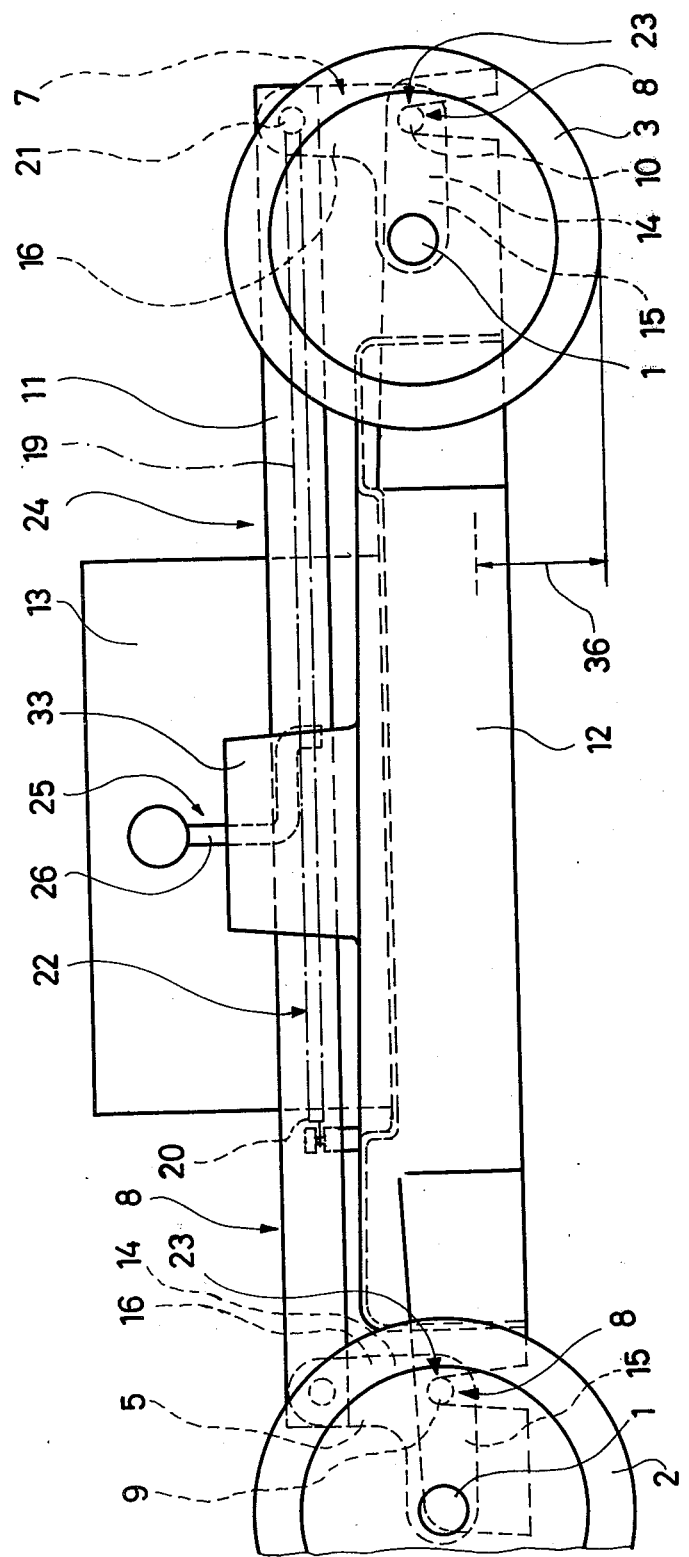
FIG. 1 is a side view of a lawn mower in accordance with the present invention.
Figure 2:
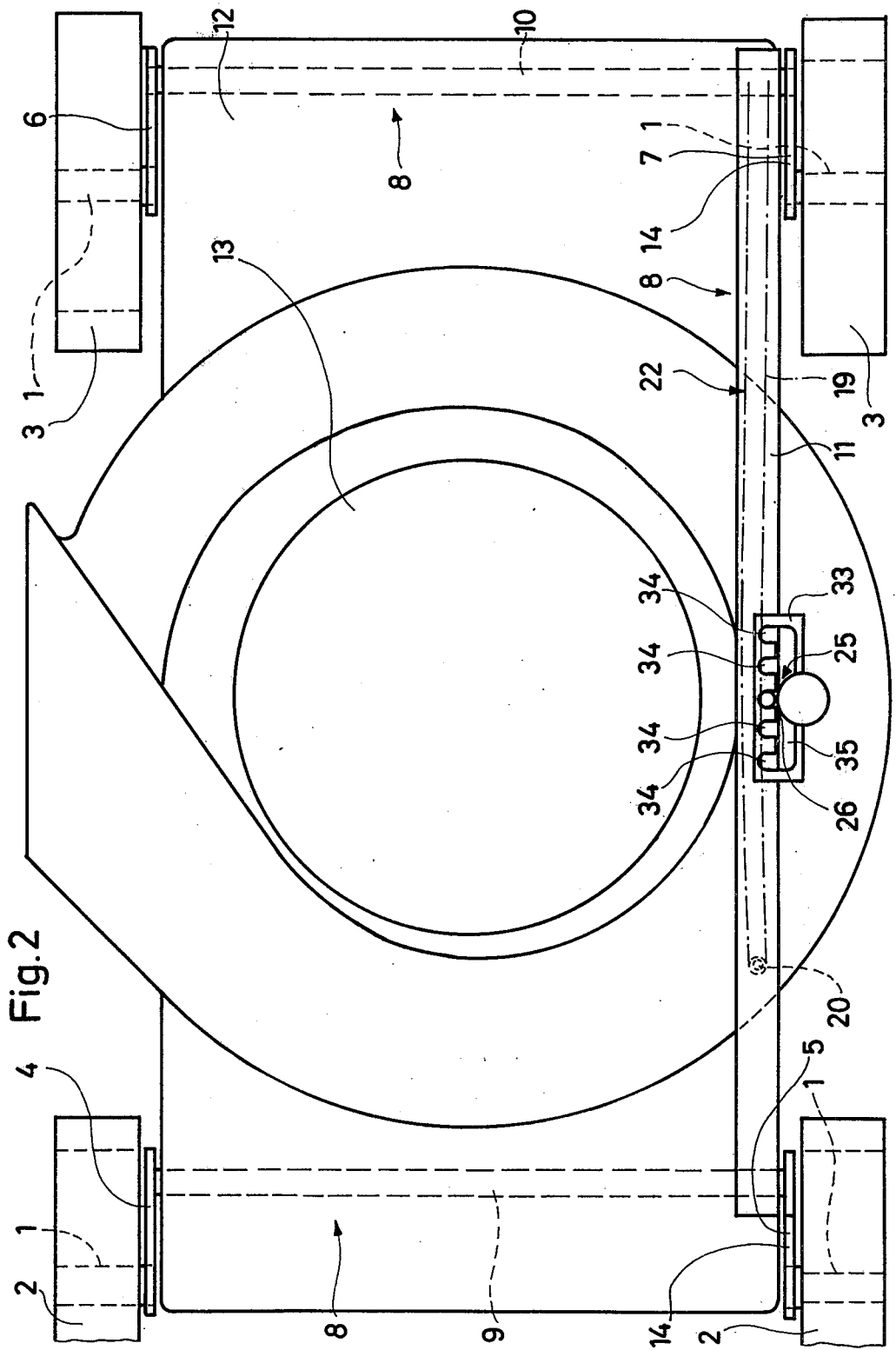
FIG. 2 is a plan view of a lawn mower of the invention.
Figure 3:
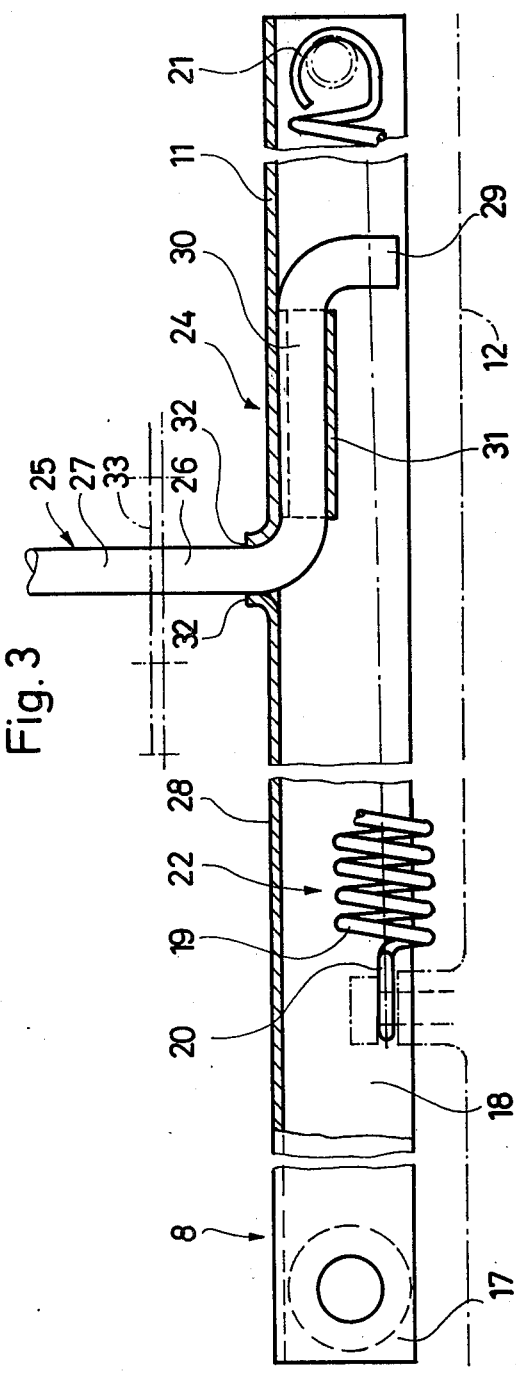
FIG. 3 is a longitudinal sectional view of a connecting rod serving simultaneously as a connecting member and an adjusting member.
Figure 4:
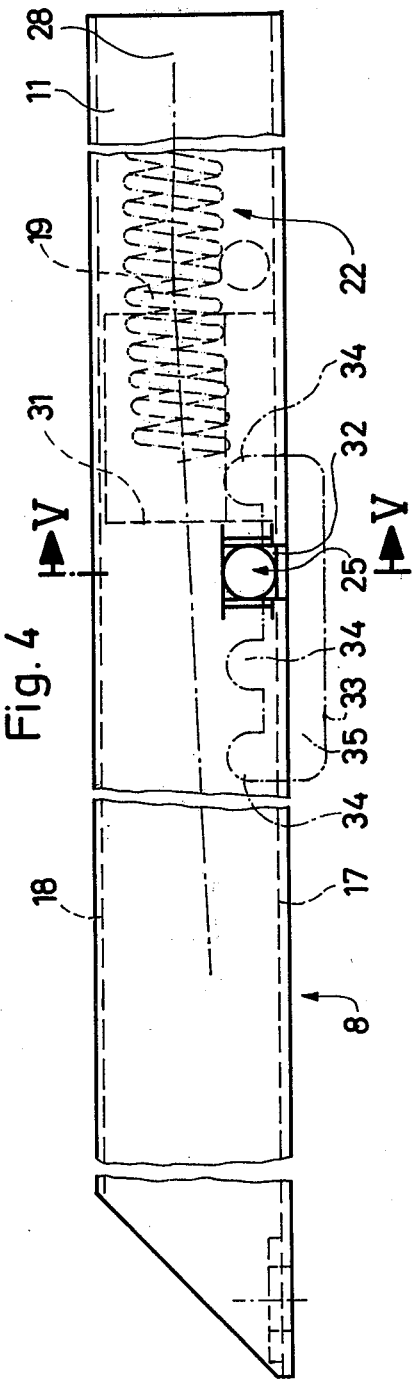
FIG. 4 is a plan view of FIG. 3.

As shown in the drawings, a lawn mower of the invention has front wheels 2 and rear wheels 3 mounted on shafts 1. Brackets 4, 5, 6 and 7 are connected to the shafts 1 and also are connected with each other by means of a connecting member 8, which connecting member 8 comprises a connecting rod 11 and connecting rods 9 and 10. A housing 12 carries a motor 13 and a cutting element mounted on an output shaft of the motor 13, which cutting element is known per se in the art and therefore is not shown in the drawing. The housing 12 rests on the connecting rods 9 and 10. The brackets 5 and 7 located at the same side of the lawn mower are formed as angle members 14 each having two wings 15 and 16 connected with one another at an apex. An end portion of the wing 15 spaced from the apex of the angle member 14 is connected to the shaft 1, whereas the end portion of the wing 16 spaced from the apex is articulately connected with the connecting rod 11 so that connecting points of the angle member 14 with the shaft 1 and with the connecting rod 11 form pivot points of a four-bar linkage.

The connecting rod 11 has a U-shaped cross-section and comprises two wings 17 and 18 connected with one another by an intermediate part 28. A spring 19 is received in a recess formed between the wings 17 and 18. One end 20 of the spring 19 is connected to the housing 12 and the other end 21 is connected to the connecting rod 11 by means, for instance, of a connection with the bracket 7. The spring 19 serves as energy storing means 22 and in this case is protected and covered by the connecting rod 11. The connecting rods 9 and 10 form connecting elements 23 each connecting the brackets 4 and 5 and the brackets 6 and 7 with one another, respectively.

The connecting rod 11 serves not only as a connecting member connecting the brackets 5 and 7 with one another, but also as an adjusting member 24, for a central adjustment of the cutting height of the cutting element by means of a lever 25. The lever 25 is formed as a double-bent rod 26. One end portion 27 of the lever 25 is formed as a handle and extends through the intermediate part 28 of the connecting rod 11, whereas the other end portion 29 of the lever 25 engages the spring 19. An intermediate portion 30 of the lever 25 is pivotally mounted on the inner surface of the intermediate part 28 of the connecting rod 11 by means of a plate 31. A bore 32 in the connecting rod 11 permits pivoting of the lever 25 in a direction normal to the direction of the elongation of the connecting rod 11 and thereby permits a movement of the lever 25 relative to the connecting rod 11. The lever 25 can engage a coulisse or gate 33, which coulisse 33 is fixedly connected to the housing 12 and is provided with a plurality of recesses or depressions 34 connected with each other by a longitudinal slot 35. The lever 25 can engage in each of the above-mentioned depressions 34.

Figure 5:
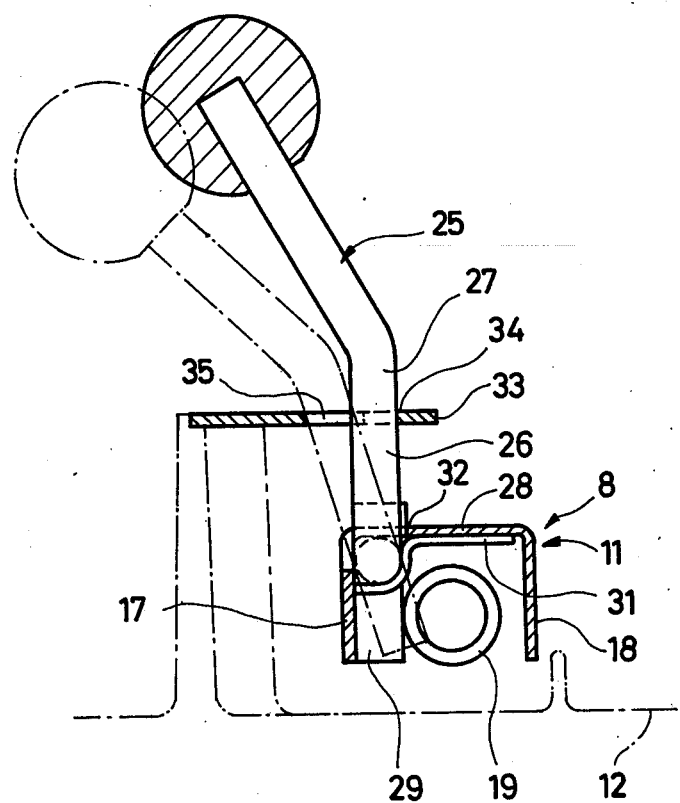
FIG. 5 is a cross-sectional view taken through the line V—V of FIG. 4.

The weight of the housing 12 with the motor 13 and the cutting element is transferred through the connecting rods 9 and 10 and the brackets 5 and 7 onto the shafts 1 of the wheels 2 and 3. In this case the cutting height 36 of the cutting element depends upon the position of the connecting rod 11, that is, upon the position of the lever 25 relative to the housing 12 or to the coulisse 33. When the lever 25 is removed from the respective depressions 34 by acting on the handle-shaped portion 27, the brackets 5 and 7 are subjected to a torque resulting from the weight of the housing 12 with the motor 13 and the cutting element. This torque is opposed by a tension force of the spring 19 generating a torque substantially equal to the torque resulting from the above mentioned weight, so that the lever 25 can move effortlessly in both direction lengthwise of the longitudinal slot 35 of the coulisse 33 for increasing or reducing the cutting height. FIG. 5 illustrates the lever 25 in the position in which the lever 25 is received in the depression 34 of the coulisse 33 which position is shown in solid lines, and in the position in which the lever 25 is withdrawn out of the same which position is shown by dotted lines. During withdrawing of the lever 25 out of the depression 34 of the end portion 29 of the lever 25 presses against the spring 19. In the desirable position the lever 25 must be merely released, and the tension force of the spring 19 presses the lever 25 into the respective depression 34 to thereby set a new cutting height.

The lawn mower of the present invention provides for highly advantageous results. It permits to adjust the cutting height more easily and conveniently than the conventional lawn mowers permit. Due to the provision of the energy storing means counteracting the weight of the housing means, the motor and the cutting element, the adjustment of the cutting height is not difficult for a user and requires the minimum efforts. The simultaneously performed adjustment of the distance from the housing means relative to the shafts of all the wheels of the lawn mower is essentially a less time-consuming and labor-consuming operation.

It will be understood that each of the elements described above, or two or more together, may also find a useful application in other types of constructions differing from the types described above.

While the invention has been illustrated and described as embodied in a lawn mower, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lawn mower, comprising a plurality of wheels each having a shaft; housing means carrying a cutting element and drive means for driving the latter, said housing means being connected to said shafts movable relative to the same so as to change the distance between said housing means and said shafts to thereby correspondingly change the cutting height of said cutting element; an adjusting member movable between a plurality of positions and arranged to arrest said housing means in each of said positions to thereby adjust said distance between said housing means and said shafts; and one spring which connects said housing means with at least one of said shafts and is simultaneously engageable with said adjusting member so that said one spring simultaneously performs two functions one of which is to substantially counteract the weight of said housing means, said drive means and said cutting element so as to aid a user in upwardly adjusting said cutting height, and the other of which is to resiliently bias said adjusting member to said positions so as to retain said adjusting member in each of said positions.

2. The lawn mower as defined in claim 1, wherein said one shaft is provided with one bracket; said spring being provided between said housing means and said one bracket.

3. The lawn mower as defined in claim 2, wherein said spring has two end portions spaced from one another, a first one of said end portions being connected to said housing means and a second one of said end portions being connected to said one bracket.

4. The lawn mower as defined in claim 3, wherein said one bracket is formed as an angle element having two wings, said wings being fixedly connected with one another in an apex and each having an end section spaced from said apex, an end section of a first one of said wings being connected with said shaft, an end section of a second one of said wings engaging said second end portion of said spring.

5. The lawn mower as defined in claim 4 and further comprising a connecting element connecting said one bracket with said housing means and located intermediate said end sections of said first and said second wings of said angle element.

6. The lawn mower as defined in claim 5, and further comprising detent means fixedly connected to said housing means, said adjusting member being engageable with said detent means so as to arrest said housing means in each of said positions.

7. The lawn mower as defined in claim 6, wherein said detent means are formed as a coulisse provided with a plurality of depressions, each corresponding to the respective one of said positions; said adjusting member being a lever receivable in each of said depressions so as to engage said coulisse.

8. The lawn mower as defined in claim 7, wherein said spring extends between said housing means and said one bracket in said first direction, and a lever being pivotable in a second direction substantially normal to said first direction and between a first position in which said lever enters the respective one of said depressions and engages said coulisse, and a second position in which said handle leaves said respective one of said depressions and is disengaged from said coulisse.

9. The lawn mower as defined in claim 7, wherein said coulisse is further provided with a slot extending substantially parallel to said adjusting member and communicating said depressions with each other.

10. The lawn mower as defined in claim 3, wherein said plurality of wheels include at least a pair of substantially coaxial wheels, one of said pair of wheels being mounted on said shaft and provided with said one bracket, and the other of said pair of wheels being mounted on a further shaft and provided with a further bracket, said bracket and said further bracket being connected with one another so as to jointly adjust the distance between said housing means and said shafts of said pair of wheels.

11. The lawn mower as defined in claim 10, wherein said plurality of wheels further comprises an additional pair of substantially coaxial wheels mounted on additional shafts and provided with additional brackets connected to one another, said brackets of said pair of wheels and said additional brackets of said additional wheels being connected with one another so as to jointly adjust the distance between said housing means, and said shafts and said additional shafts.

12. The lawn mower as defined in claim 11, and further comprising a connecting member connecting said brackets of said pair of wheels and said additional brackets of said additional pair of wheels with each other, and connected to each of said brackets in a connecting point, said shafts and connecting points at which said connecting member is connected to brackets located at the same side of the lawn mower being pivot points of a four-bar linkage.

13. The lawn mower as defined in claim 12, wherein said brackets located at the same side of the lawn mower are formed as angle members; said connecting member including a connecting rod connecting said brackets located at the same side of the lawn mower with one another and associated with said adjusting member so as to adjust said distance between said housing means and said shafts of said wheels, and further including further connecting rods each connecting said brackets of the respective pair of wheels with one another and with said housing means.

14. The lawn mower as defined in claim 13, and further comprising a lever resting on said intermediate part of said connecting rod and formed as a double bent member, said member having a first marginal end portion engageable with said spring and a second marginal end portion formed as a handle.

15. The lawn mower as defined in claim 14, wherein said connecting rod extends in one directin, said lever being connected with said connecting rod so as to prevent a displacement of said lever in said one direction and to permit pivoting of said lever in another direction substantially normal to said one direction.

16. A lawn mower, comprising a plurality of wheels each having a shaft, said plurality of wheels including a first pair of substantially coaxial wheels and a second pair of substantially coaxial wheels each provided with a bracket formed as an angle member; housing means carrying a cutting element and drive means for driving the latter, said housing means being connected to said shafts movable relative to the same so as to change the distance between said housing means and said shafts to thereby correspondingly change the cutting height of said cutting element; and energy storing means provided between said housing means and at least one of said shafts and adapted to substantially counteract the weight of said housing means, said drive means and said cutting element so as to aid a user in upwardly adjusting the cutting height, said energy storing means being formed as a spring which has two end portions connected to one bracket of one wheel of one of said pairs and said housing means respectively; an adjusting member connected to said one bracket and movable relative to said housing means in a first direction between a plurality of positions, said adjusting member being adapted to arrest said housing means in each of said positions to thereby adjust said distance between said housing means and said shafts, said brackets of said first pair of wheels being connected with one another and with said adjusting member, and said brackets of said second pair of wheels being connected with one another so as to jointly adjust the distance between said housing means and said shafts of said pair of wheels; and a connecting member connecting said brackets of said first pair of wheels and said second pair of wheels with each other, and connected to each of said brackets in a connecting point, said shafts and connecting points at which said connecting member is connected to brackets located at the same side of the lawn mower being pivot points of a four-bar linkage, said connecting member including a connecting rod connecting the brackets located at the same side of the lawn mower with one another and adapted to adjust said distance between said housing means and said shafts of said wheels, and said connecting member including further connecting rods each connecting said brackets of the respective pair of wheels with one another and with said housing means, said first-mentioned connecting rod being U-shaped and having two wings forming a recess therebetween and an intermediate part connecting said wings with one another, said spring of said energy storing means being received in said recess.

17. A lawn mower as defined in claim 1, wherein said adjusting member is a lever having an end portion which laterally abuts against said spring, said lever being movable between a first position in which it arrests said housing means in a respective one of said positions thereof and a second position in which it releases said housing means, said spring and said lever being so arranged that said lever moves from said first to said second position against the force of said spring, and moves from said second position into said first position and is retained in the latter under the action of the force of said spring.

18. A lawn mower as defined in claim 17, wherein said spring has an axis, said lever being movable between said positions about an axis which is parallel to said axis of said spring.

* * * * *